Patented Apr. 18, 1939

2,155,328

UNITED STATES PATENT OFFICE 2,155,328

CONDENSATION PRODUCTS AND A PROCESS OF PREPARING THEM

Max Paquin, Frankfort-on-the-Main, Germany, assignor to General Aniline Works, Inc., New York, N. Y., a corporation of Delaware No Drawing. Application August 25, 1937, Serial No. 160,932. In Germany July 21, 1934

2 Claims. (Cl. 260—2)

The present invention relates to condensation products and to a process of preparing them.

This application is a continuation-in-part of my co-pending application Serial No. 31,734, filed July 16, 1935.

It is known to cause alkylene-oxide to react with organic amino compounds.

Now I have found that condensation products of valuable technical properties are obtainable by causing one mol of an alkylene oxide to react with one mol of an amino compound containing at least 2 amino groups and heating the reaction product thus obtained after addition of one mol of urea, thiourea or guanidine or of a derivative of these compounds, such as for instance ethyl urea, isopropyl urea, methyl guanidine.

The amino compounds containing at least 2 amino groups and coming into consideration for the purpose of the present invention belong to the following classes: aliphatic diamines and polyamines, aromatic diamines and polyamines, urea, thiourea, guanidine, derivatives of these compounds having at least one replaceable hydrogen atom attached to a nitrogen atom.

The products which are caused to react with the condensation products from the amino compound and the alkylene oxide have the general formula:

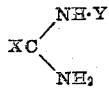

wherein

X stands for O, S or NH and

Y means H or an aliphatic hydrocarbon radical.

Even at temperatures which lie only a little above the melting point of urea, thiourea and guanidine, respectively, a vivid evolution of ammonia takes place, which increases pari passu with the condensation. The process is advantageously carried out by heating the reaction components to temperatures between about 70° C. and 200° C., preferably to temperatures between 100° C. and 150° C. The reaction is complete as soon as the evolution of ammonia decreases or ceases.

The constitution of the new condensation products thus obtained cannot be indicated with certainty. In some fields the products possess the valuable properties of the oxyalkylated starting materials in a considerably increased measure and may, therefore, advantageously be used as cleansing and foaming agents, as agents for emulsifying fats, waxes and hydrocarbons, as sizes for viscose artificial silk, as assistants for the textile printing industry, as emulsifying and through-dyeing agents for the dyeing industry; they may also serve as fungicides and/or insecticides. They form water-soluble compounds and represent thickly liquid (viscous) liquids to viscous resins.

The following examples serve to illustrate the invention, but they are not intended to limit it thereto; the parts are by weight:

(1) 119 parts of the reaction product of 1 mol of ethylene-diamine and 1 mol of propylene-oxide are heated for 1 hour at 140° C. to 145° C. with 59 parts of guanidine. A brisk evolution of ammonia occurs and an amorphous condensation product is formed which may advantageously be used for printing with vat-dyestuffs.

(2) 104 parts of the reaction product of 1 mol of ethylene diamine and 1 mol of ethylene oxide are heated for about 1 hour at 110° C. to 120° C. with 60 parts of urea that is to say until 1 drop of the melt put on a glass plate does no longer solidify to the crystalline state. The condensation takes place with a vivid splitting off of ammonia and water. A highly viscous water-soluble substance is obtained which may advantageously be used for printing with vat-dyestuffs.

(3) 104 parts of the reaction product of 1 mol of urea and 1 mol of ethylene oxide are heated for 1½ hours at 135° C. to 140° with 88 parts of ethylurea, while stirring. A condensation product is obtained with evolution of ammonia; it may be used in the dyeing industry, especially as through-dyeing agent.

(4) 119 parts of the reaction product of 1 mol of ethylene diamine and 1 mol of propylene oxide are heated for 1½ hours at 140° C. to 145° C. with 60 parts of urea. An amorphous condensation product is obtained with vivid evolution of ammonia; it may advantageously be used for printing with vat-dyestuffs.

(5) 104 parts of the reaction product of 1 mol of urea and 1 mol of ethylene oxide are heated for 1½ hours at 130° C. to 135° C. with 60 parts of urea, while stirring. An amorphous condensation product is obtained with splitting off of ammonia; it may be used in the dyeing industry, especially as through-dyeing agent.

(6) 60 parts of urea (1 mol) are caused to react at 130° C. with 59 parts of propylene oxide (1 mol) and then heated, while stirring, at 130° C. to 135° C. for about 1¼ hours with 76 parts of thiourea (1 mol). The product thus obtained is readily soluble in water and may be used as fungicide and/or insecticide.

(7) 74 parts of methylurea (1 mol) are caused to react at 105° C. with 44 parts of ethylene oxide (1 mol) and subsequently heated for about 1½ hours at 140° C. to 145° C. with 60 parts of urea (1 mol) until a test portion no longer shows any crystallization. The product which is readily soluble in water may be used as a size for artificial silk.

(8) 60 parts of ethylene diamine (1 mol) are caused to react at 100° C. with 59 parts of propylene oxide (1 mol) and subsequently heated for about 1½ hours at 130° C. to 135° C. with 88 parts of ethylurea until a test portion of the melt no longer shows any crystallization. The amorphous product obtained which is readily soluble in water may be applied as foaming agent or for cleansing purposes.

(9) 60 parts of urea (1 mol) are caused to react at 130° C. with 59 parts of propylene oxide (1 mol) and subsequently mixed with 59 parts of freshly prepared guanidine (1 mol) dissolved in a small amount of water; after evaporation of the water, while stirring, the whole is heated for about 1½ hours at 120° C. to 125° C. until a test portion no longer shows any crystallization. The product obtained which is readily soluble in water may be used as addition in the printing with vat-dyestuffs.

(10) 59 parts of freshly prepared guanidine (1 mol), dissolved in a small quantity of water, are caused to react at 90° C. to 95° C. with 44 parts of ethylene oxide (1 mol); 60 parts of urea (1 mol) are then added, the water evaporated and the whole heated in an open vessel for about 1 hour at 120° C. to 125° C. until a test portion no longer shows any crystallization. The semi-solid, readily soluble product obtained is suitable as addition in the printing with vat-dyestuffs.

(11) 108 parts of 1·4-diaminobenzene (1 mol) are caused to react at 130° C. to 135° C. with 44 parts of ethylene oxide (1 mol). A product soluble in water is obtained which is caused to react for about 1½ hours at 140° C. to 145° C. with 60 parts of urea (1 mol) until any crystallization no longer occurs. The darkish product obtained which is soluble in water is suitable as addition in the printing with vat-dyestuffs.

I claim:

1. The process which comprises causing one mol of propylene oxide to act upon one mol of ethylene diamine and then heating the reaction product after adding one mol of urea.

2. The condensation product obtained by reacting one mol of propylene oxide upon one mol of ethylene diamine and subsequently heating the reaction product in the presence of one mol of urea, the product being a water-soluble compound of resinous state.

MAX PAQUIN.